US000001125H

United States Statutory Invention Registration [19]

[11] Reg. Number: H1125

Stanek

[43] Published: Jan. 5, 1993

[54] TENSIONING RING

[75] Inventor: Tom G. Stanek, Roswell, Ga.

[73] Assignee: W. R. Grace & Co.-Conn., Duncan, S.C.

[21] Appl. No.: 870,435

[22] Filed: Apr. 9, 1992

[51] Int. Cl.[5] ..... A22C 11/02

[52] U.S. Cl. ..... 452/38

[58] Field of Search ..... 452/38

[56] References Cited

U.S. PATENT DOCUMENTS 4,958,412 9/1990 Stanek ..... 452/38

*Primary Examiner*—Stephen C. Bentley

*Attorney, Agent, or Firm*—William D. Lee, Jr.; Mark B. Quatt; Jennifer L. Skord

[57] ABSTRACT

A tensioning ring comprising a ring with a plurality of roller balls disposed circumferentially around the inner circumference of the ring, and capable of accommodating an unshirred casing passing between the ring and a stuffing horn.

1 Claim, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TENSIONING RING

FIELD OF THE INVENTION

The present invention relates to a tensioning ring, and more particularly to a tensioning ring for casings in which liquid smoke or colorants may be introduced to the interior of a food casing.

BACKGROUND OF THE INVENTION

It is well known in the food packaging art to stuff synthetic or cellulosic tubular casings with various meat products. These products are typically processed and introduced into the casings in the form of an emulsion or comminuted form.

In automated processes, processed meat products are typically introduced into a shirred casing. This is a casing which is shirred to a much shorter length than the actual length of the casing. As the automated process is operated, the shirred casing is fed typically over a sizing ring which unshirres the casing before stuffing with the meat product. Of course, the diameter of the sizing ring will be predetermined in accordance with the size of the intended casing which will be used for the particular packaging operation.

It is also common practice to introduce liquid smoke, colorant, or other similar additives to certain processed meat products such as sausage or luncheon meats to impart the desired flavor or color to the food product. These additives are usually blended into the food product before the stuffing operation, or impregnated into the casing material itself if the composition of the casing permits impregnation of such additives.

This general practice requires an additional step prior to the stuffing operation. In the case of pre-blending the colorant or liquid smoke into the food product, sometimes more additive is used than is really required. For example, if only the surface of the food product requires the colorant or liquid smoke, pre-blending uses excess additive which is blended throughout the food product.

Additionally, in the case of some synthetic casings, liquid smoke and colorant are not easily added to the casing material itself, and if added are not readily retained by the casing material.

For these reasons, it is desirable to provide a method and apparatus for coating the exterior of a processed meat product, packaged in a casing, which does not require the pre-blending of the additive before the stuffing operation, or impregnation of the casing material itself with the additive.

U.S. Pat. No. 4,958,412 (Stanek) discloses a sizing ring in which a channel located within a cylindrical sleeve portion allows for the transfer of a liquid additive to the outer extremity of the sizing ring. Grooves in the outer face of the ring transmit the additive from the ring onto the interior of the casing as it is unshirred. The liquid additive is then transferred to the exterior surface of the stuffed meat or other product.

In using the color ring described in U.S. Pat. No. 4,958,412, to deposit color or liquid smoke on the interior surface of a shirred casing, conventional skin brakes on the front end discharge of the stuffing horn could potentially remove some of the applied color or liquid smoke.

To solve this problem, a ring with multiple plastic roller balls around the circumference thereof, and outside of the casing, provides tension and reduces air voids in the stuffed casing without wiping away the applied color or smoke.

SUMMARY OF THE INVENTION

A tensioning ring suitable for use with a tubular casing and a stuffing horn comprises a ring with a plurality of roller balls disposed around the inside circumference of the ring, and capable of accommodating an unshirred casing passing between the ring and a stuffing horn.

BRIEF DESCRIPTION OF THE DRAWINGS

The invention may be further understood by reference to the following figure drawings, given by way of illustration only.

DESCRIPTION OF THE PREFERRED EMBODIMENTS

Figure 1:
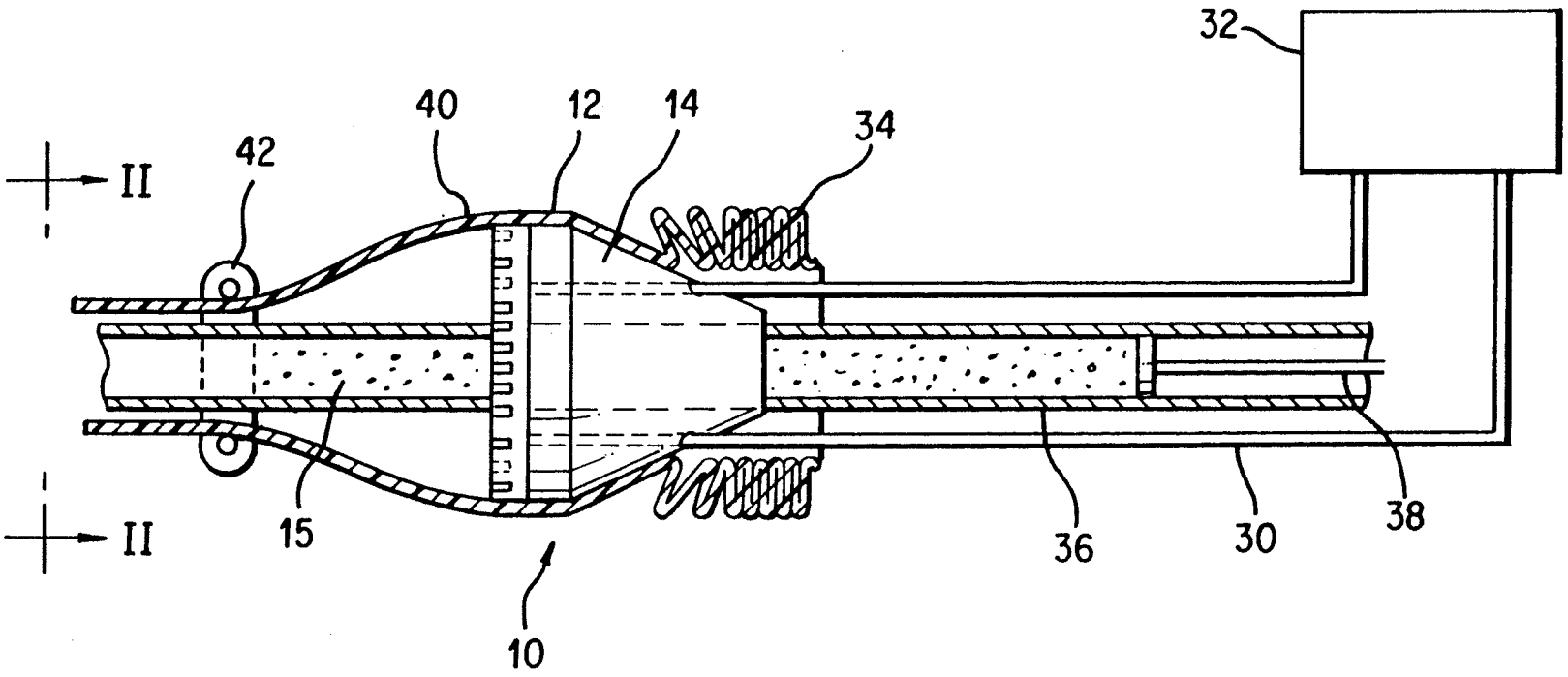
FIG. 1 is a schematic side view of the apparatus, sizing ring, and tensioning ring of the present invention.

Referring to FIG. 1, an apparatus for coating a food product such as a meat emulsion with liquid smoke or colorant includes a sizing ring 10 having a cylindrical portion 12 and a frustoconical portion 14. A sizing ring of this general configuration has been commercially available from the Cryovac division of W. R. Grace & Co.-Conn.

By using channels in the interior of the ring, as indicated in phantom lines in FIG. 1, additives such as liquid smoke, colorant, or other materials may be passed through the sizing ring and onto an outer extremity of the ring. There, the unshirred casing 40, as it passes over the sizing ring, picks up the colorant or other material and deposits it on the interior side of casing 40. Some of this additive then transfers to the outer surface of the meat emulsion 15.

As seen in FIG. 1, the liquid source 32 supplies liquid smoke or other additives through tubing 30 to the sizing ring 10. The additive is then passed through one or more channels and up into an outer extremity of the sizing ring. The additive will then disperse to facilitate the transfer of the additive from the sizing ring's exterior surface to the interior surface of the unshirred tubing 40 as it passes over the sizing ring 10.

At the same time, the meat emulsion 15 or other food product 15 to be stuffed into the casing material is pushed forward by ram 38 and passes through the hollow core of the sizing ring as is typical in the art.

The shirred casing 34 itself is well known in the art, and various means have been devised to install sections of shirred casing onto stuffing horns, or alternatively onto a support sleeve which has in turn been installed on a stuffing horn. Those skilled in the art will readily recognize the adaptability of the present invention to various stuffing assemblies and apparatus.

Figure 3:
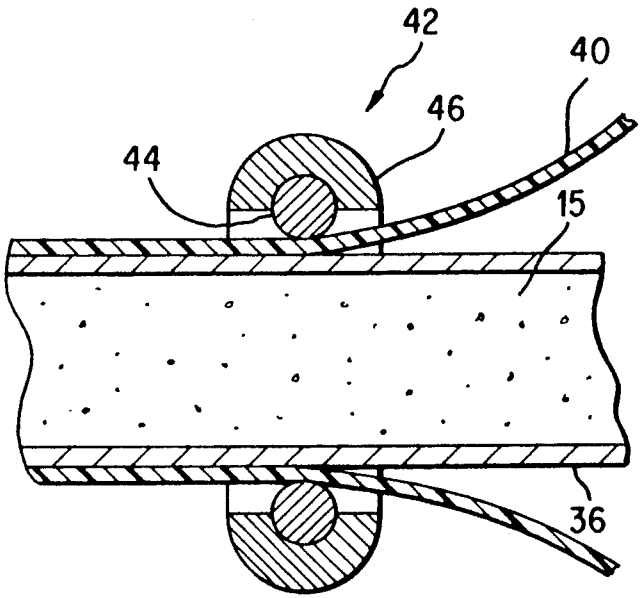
FIG. 3 is a cross-sectional view of a tensioning ring taken along lines III—III of FIG. 2.
Figure 2:
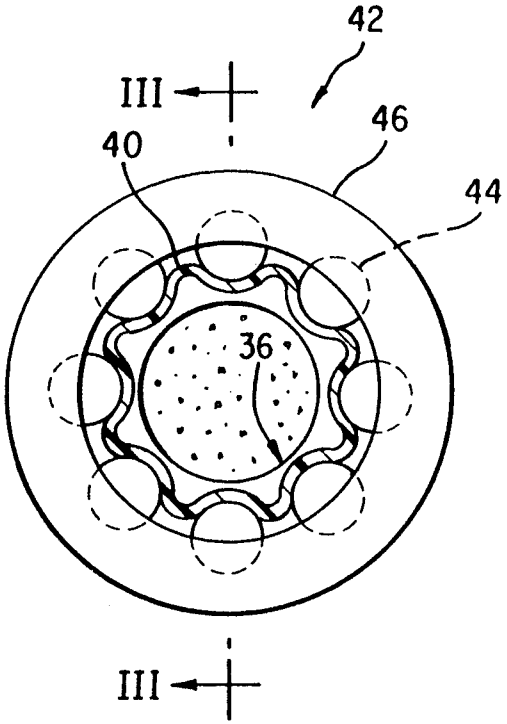
FIG. 2 is a cross-sectional view of a tensioning ring taken along lines II—II of FIG. 1.

Referring to FIGS. 2 and 3, detail of the tensioning ring 42 in accordance with the present invention is seen. Typically, a plurality of roller balls 44 are disposed circumferentially around the inside circumference of a doughnut shaped ring 46. The roller balls 44 are shown partially in phantom to indicate that part of each roller ball is preferably embedded or otherwise disposed in the doughnut ring 46 in such a way that they rotate freely as the casing passes in communication with them, in the manner of roller bearings. Unshirred tubing 40 is shown in cross-section as it passes between roller balls 44 and stuffing horn 36.

Conventional skin brakes apply external pressure against the stuffing horn with the casing material in between the skin brake and the stuffing horn. This serves to void air and provide proper tensioning. However, when used in connection with the sizing ring as described above, with color or liquid smoke applied to the interior surface of the casing material, such coatings can be undesirably wiped away from the inside of the casing. To correct this problem, the tensioning ring of the present invention allows for the passage of the unshirred casing 40 between the tensioning ring and the stuffing horn without significantly wiping away the color or other coating on the interior of the casing, that has been deposited there by means of the sizing ring.

The roller balls 44 may vary in diameter and distribution around the circumference of the doughnut ring 46. The roller balls 44 and ring 46 may also vary in construction, and may be made of metal, plastic, or other suitable materials. While the cross-section of FIG. 2 shows considerable distortion in the unshirred tubing 40 in areas between adjacent roller balls, in practice the roller balls may be made small enough, and may be used in great enough number, to minimize any curvature of the tubing.

Those skilled in the art will readily understand that other modifications may be utilized with varying success. These modifications are therefore deemed to be within the spirit and scope of the claim as defined below.

What is claimed is:

1. A tensioning ring comprising a ring with a plurality of roller balls disposed circumferentially around the inner circumference of the ring, and capable of accommodating an unshirred casing passing between the ring and a stuffing horn.

* * * * *